Jan. 17, 1939.   N. S. FOCHT   2,144,583
HYDRAULIC SHOCK ABSORBER
Original Filed May 12, 1936   3 Sheets-Sheet 1

Inventor
Nevin S. Focht,
By
Attorney

Jan. 17, 1939.        N. S. FOCHT        2,144,583
HYDRAULIC SHOCK ABSORBER
Original Filed May 12, 1936    3 Sheets—Sheet 2

Inventor
Nevin S. Focht,
By D. P. Wolchansky
Attorney

Jan. 17, 1939. N. S. FOCHT 2,144,583
HYDRAULIC SHOCK ABSORBER
Original Filed May 12, 1936 3 Sheets-Sheet 3

Inventor
Nevin S. Focht,

Attorney

Patented Jan. 17, 1939

2,144,583

UNITED STATES PATENT OFFICE 2,144,583

HYDRAULIC SHOCK ABSORBER

Nevin S. Focht, Cleveland, Ohio

Application May 12, 1936, Serial No. 79,381
Renewed November 23, 1938

17 Claims. (Cl. 188—88)

This invention relates to hydraulic shock absorbers of the strut type as described and claimed, for example, in my prior Patent Nos. 2,035,954 and 2,036,623, and has generally in view to provide a shock absorber of this type embodying various improved features of construction, combination, arrangement and mode of operation of the parts thereof, all contributing to a shock absorber which is of comparatively low production and maintenance cost and which is exceptionally effective in absorbing all shocks to which it may be subjected.

A special object of the invention is to provide in a shock absorber of the strut type having a cylinder and a piston, a novel combination of novel valves cooperating with each other and with the cylinder and piston to control the flow of liquid between the pressure chambers within the cylinder at opposite sides of the piston so as to regulate the relative movements of the cylinder and piston to obtain highly effective shock absorbing results.

Another special object of the invention is to provide a shock absorber of the strut type having valves of sturdy, simplified construction which are designed to operate over long periods of time without requiring repair or adjustment, and which are so mounted in the shock absorber and so constructed that they may readily be removed and disassembled for repair or adjustment purposes whenever the need arises.

Another special object of the invention is to provide simple, effective means to prevent loss of liquid from the shock absorber and to eliminate therefrom any air which may have been entrapped therein and which, if allowed to remain therein, might form air pockets adversely affecting the operation of the shock absorber.

With the foregoing and other objects in view, which will become more fully apparent as the nature of the invention is better understood, the same consists in the novel features of construction, combination and arrangement of parts as will be hereinafter more fully described, illustrated in the accompanying drawings and defined in the appended claims.

In the drawings, wherein like characters of reference denote corresponding parts in the different views.

Referring to the drawings in detail, it will be observed that the present shock absorber is of the strut type illustrated in my aforesaid prior applications, and that same includes a working cylinder 10 and a piston 11 for connection, respectively, with any desired pair of relatively movable elements, such, for example, as the axle and the chassis of a motor vehicle.

While the present shock absorber may be disposed for operation either vertically or horizontally or at any desired inclination, it will be assumed for purposes of simplifying the present description, to be disposed vertically.

Figure 1:
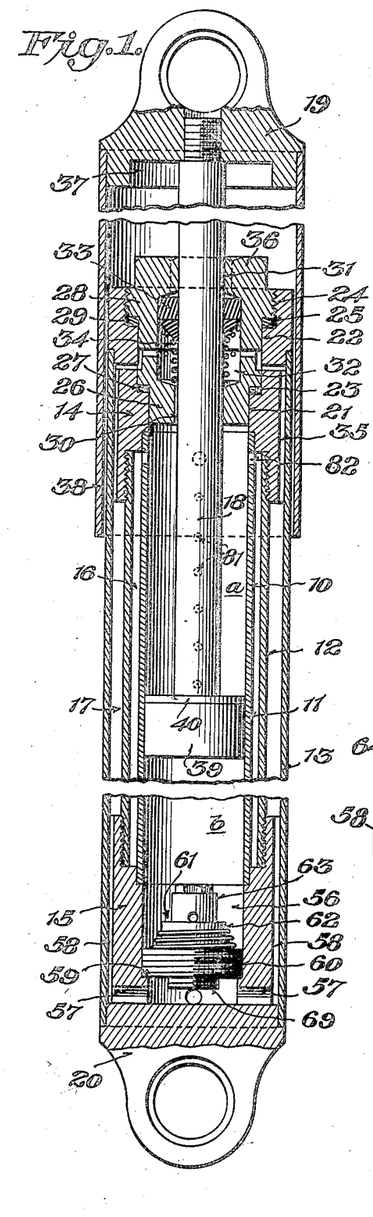
Figure 1 is a central, longitudinal section through a shock absorber embodying the improved features of the invention.

Concentric with and surrounding the cylinder 10 is a tube 12 which is of somewhat greater internal diameter than the external diameter of said cylinder. Similarly, a casing 13 of somewhat greater internal diameter than the external diameter of the tube 12 is disposed in concentric surrounding relationship to said tube. The cylinder, tube and casing are closed at their ends by upper and lower heads 14 and 15, respectively, the tube 12 in the present instance being threaded at its ends into said heads and the latter being provided with counter-bores accommodating the ends of the cylinder 10, and with exterior, slightly tapered and shouldered surfaces with which are engaged the end portions of the casing 13. The tube 12, by being threaded into the heads, connects them together and maintains the cylinder 10 and the casing 13 clamped therebetween. In this connection and as will later become apparent, it is not necessary to remove either of the present heads 14 or 15 to afford access to any of the working parts of the present shock absorber. Consequently, exceptionally rigid, liquid-tight, taper-fit or other suitable joints may be provided between said heads 14 and 15 and the ends of the cylinder 10 and the casing 13.

Because of the concentric, spaced apart relationship of the cylinder 10, tube 12 and casing 13 a liquid passageway, designated as 16, is provided between said cylinder and said tube and a liquid reservoir, designated as 17, is provided between said tube and said casing.

The piston 11 is reciprocable within the cylinder 10 and in its normal position is disposed approximately midway between the heads 14 and 15, dividing the cylinder into upper and lower pressure chambers designated as $a$ and $b$, respectively. Extending upwardly from said piston through the chamber $a$ and the head 14 is a piston rod 18 which, at its upper end, carries a lug 19 for connection with one of the relatively movable elements, such as the chassis of a vehicle, movements of which are to be controlled by the shock absorber. Similarly, the lower head 15 is provided with a lug 20 or is otherwise suitably formed, or alternatively, the body of the shock absorber is suitably formed for connection with the other of the elements, such as a vehicle axle, movements of which are to be controlled by the shock absorber.

The head 14, upwardly of the shoulder against which seats the upper end of the cylinder 10, has a bore 21 forming a continuation of the bore of said cylinder. Upwardly of this bore 21, which may be of any suitable length, the head is counterbored as indicated at 22, thereby providing an upwardly facing shoulder 23 outwardly of the bore 21 at the top thereof. The counterbore 22 does not extend to the top of the head 14 but itself is counterbored as indicated at 24, thereby providing a shoulder 25 outwardly of the counterbore 22 at the top thereof. As shown, the second counterbore opens through the top of the head and is internally threaded.

Within the head 14 is a removable cylinder head 26 having a bottom portion closely fitting the bore 21 and a top portion of greater diameter closely fitting the counterbore 22. Due to the different diameters of said portions, a shoulder is formed at the bottom of the top portion and overlying the shoulder 23. Between said shoulders is a packing member 27. Above the removable cylinder head 26, the head 14 has engaged therewith a cylinder head retaining nut 28. An upper part of this nut is threaded into the counterbore 24 and a lower part thereof is disposed within the counterbore 22 against the top of the removable cylinder head, thereby securing the latter within the head 14 and maintaining the packing washer 26 compressed so that no leakage of liquid may occur between the head 14 and the removable cylinder head 26. At the bottom of the upper part of the nut 28 is a shoulder which overlies the shoulder 25. Between said shoulders is a packing washer 29 which is maintained compressed by said nut so that no liquid may escape around the latter.

In the bottom portion of the removable cylinder head 26 is a central bore 30 and in the upper part of the nut 28 is a central bore 31. The piston rod 18 extends through the bores 30 and 31 and neatly fits the last mentioned bore. On the other hand, the bore 30 is either of slightly greater diameter than the piston rod, or is grooved longitudinally, so that a small amount of liquid and any air contained in the cylinder may escape therethrough from said cylinder into a chamber 32 formed by counterbores in the top and bottom portions of the removable cylinder head 26 and the nut 28, respectively.

In the counterbore of the nut 28 in surrounding relationship to the piston rod 18 is packing material 33 which is maintained compressed and in sealing engagement with said nut and said piston rod by an expansion coil spring 34 seated at its bottom against the shoulder at the bottom of the counterbore in the removable cylinder head and at its top against the bottom of said packing.

The top portion of the removable cylinder head 26 is of reduced external diameter to provide an annular space between said portion and the wall of the counterbore 22, and in the upper edge, or through the upper part of said head are formed grooves or ducts affording communication between the chamber 32 and said annular space. The head 14 is grooved and provided with ducts 35 affording communication between said annular space and the liquid reservoir 17. Therefore, the chamber 32 is in communication with said reservoir.

Whenever the piston 11 and the head 14 are moved toward each other, or whenever for any other reason pressure is developed in the chamber $a$, a small amount of liquid and any air contained in the cylinder 10 escapes through the bore 30 into the chamber 32. Since very little liquid may escape through said bore 30, and since the chamber 32 is in communication with the reservoir 17, said chamber never is subjected to high pressure and the packing material 33 therefore serves effectively to prevent any loss of liquid through the bore 31. Moreover, any liquid escaping through the bore 30 into the chamber 32 is free to escape from said chamber to the reservoir 17, and due to the film of liquid between the piston rod 18 and the wall of the bore 30, any air passing from the cylinder 10 into the chamber 32 is prevented from returning to the cylinder. Thus, manifestly, the present packing means for the piston rod 18 serves both to prevent loss of liquid from the shock absorber and to purge the cylinder 10 of any air which may become entrapped therein during filling of the shock absorber and which might interfere with proper functioning of the valves thereof.

The nut 28 is provided at its top with a polygonal head 36 disposed above the top of the head 14 and the lug 19 is provided in its under side with a polygonal recess 37 to receive said head 36. Thus, by first moving the lug 19 downwardly over the head 36 and by then rotating said lug, the nut 28 may be unscrewed from the head 14, thereby permitting ready removal of the piston 11 and the removable cylinder head 26.

To exclude foreign matter from the piston rod 18 and the head 14, the lug 19 preferably is provided with a sheath 38 extending downwardly around the head 14 and the casing 13. This sheath is of sufficient length to extend over the head 14 when the piston rod 18 is at its uppermost limit of movement relative to the cylinder 10.

Figure 2:
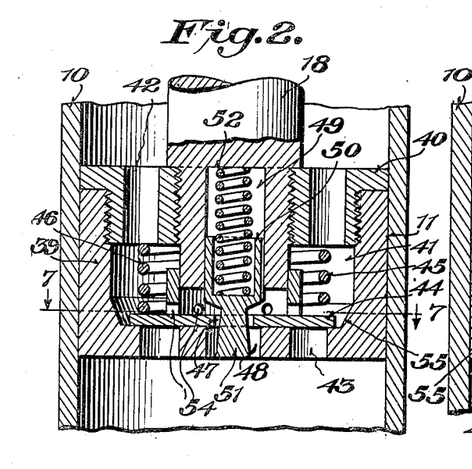
Figure 2 is an enlarged central, longitudinal section through the piston and the rebound control valve illustrating the normal status of the liquid metering pin of said valve.

The piston 11 comprises a cup-like body 39 open at its top and having side and bottom walls, and a cup 40 threaded into and closing the top of said body and having the lower end of the piston rod 18 threaded therein. There is thus provided within said piston a chamber 41 which is in constant communication with the chamber a through openings 42 in the cap 40 and in communication with the chamber b through openings 43 in the bottom wall of the body 39 under the control of a valve disk 44.

The valve disk 44 is disposed within the chamber 41 and is guided for vertical movement therein by a flange 45 extending upwardly therefrom around the lower end portion of the piston rod 18 which extends downwardly into said chamber. Normally, said disk is urged downwardly against the upper side of the bottom wall of the body 39 in covering and closing relationship to the openings 43 by a coil spring 46 seating at its bottom against said disk and at its top against the cap 40.

Figure 6:
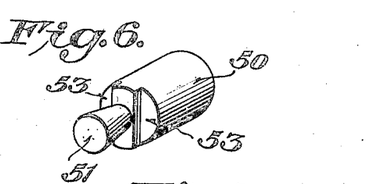
Figure 6 is a detail perspective view of the metering pin.
Figure 7:
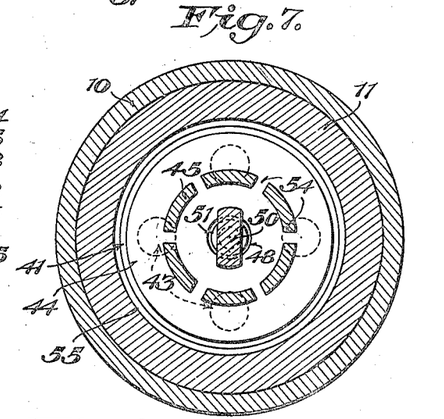
Figures 7 and 8 are cross sections on the lines 7—7 and 8—8 of Figures 2 and 5, respectively.
Figure 8:
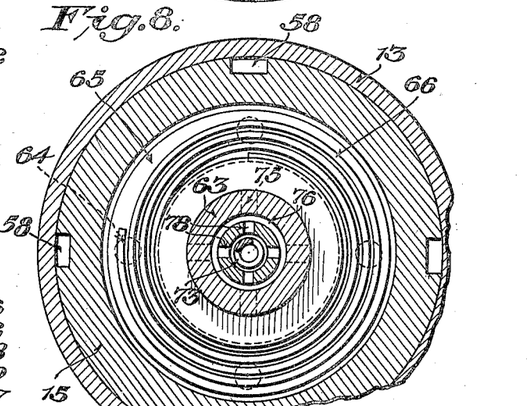

In the center of the disk 44 is an opening 47 and in the center of the bottom wall of the body 39 is an opening 48. In alignment with these openings, the piston rod 18 has a central bore 49 which opens through the bottom thereof and extends upwardly into the same a limited distance. In this bore 49 is slidably mounted a metering pin body 50 having projecting downwardly from its lower end a metering pin 51 which, toward its lower end, is of progressively increasing sectional area and which, at its lower end, is of suitably less diameter or sectional area than the central opening 47 in the valve disk 44. A coil spring 52 interposed between the body 50 and the wall defining the top of the bore 49 tends constantly to urge said metering pin body downwardly to its normal position in which it seats at its bottom against the valve disk 44 and the metering pin 51 extends through the central opening 47 in said disk valve. As illustrated in Figure 6, the bottom of the body 50 is cut away at opposite sides, as indicated at 53, or otherwise is suitably formed at its bottom, so that when it is seated against the disk 44 liquid may flow between the chamber 41 and the cylinder chamber b through openings 54 in the flange 45 and through the openings 47 and 48 around the metering pin 51.

When the shock absorber is filled with liquid, liquid is contained in the bore 49. In this connection, in order to provide for rise of the metering pin body 50 and the metering pin 51 at predetermined rates under predetermined liquid pressures in the chamber 41, the said body 50 is of suitably less diameter than the bore 49, or either said body or the wall defining the side of the bore 49 is longitudinally grooved, for flow of liquid from said bore. Moreover, in order to provide for increase in the rate of flow of liquid from the chamber b through the piston openings 43 and 42 to the chamber a as the disk valve 44 rises, the bottom portion of the piston chamber is of upwardly increasing sectional area as indicated at 55.

Obviously, when the piston 11 is removed from the cylinder 10 the parts contained within said piston are readily accessible for any purpose simply by unscrewing the piston body 39 from the cap 40.

Figure 5:
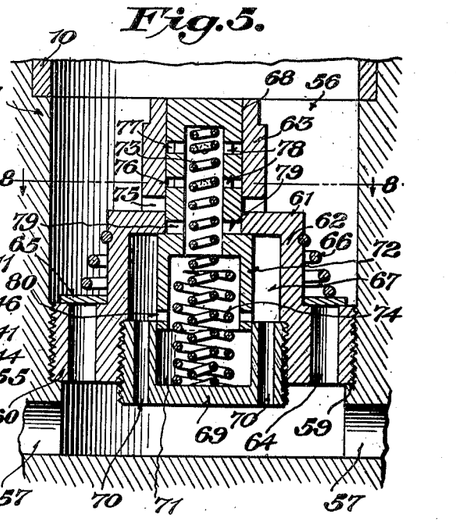
Figure 5 is an enlarged central, longitudinal section through the compression control valve.

The lower head 15 of the shock absorber has a bore 56 forming a bottom continuation of the cylinder 10, and at its bottom said bore is of reduced diameter and in communication with the reservoir 17 through lateral ducts 57 and longitudinal grooves or ducts 58 in said head.

Directly above the ducts 57 the head 15 is interiorly shouldered, as indicated at 59, and above said shoulder the wall defining the bore 56 is screw-threaded to threadedly receive the lower end portion 60 of a valve body designated generally as 61. The intermediate portion 62 of this valve body is of lesser diameter than its lower, screw threaded portion 60 and its top portion 63 is of lesser diameter than its intermediate portion 62. Extending through the lower portion 60 of said valve body are openings 64 which provide for flow of liquid between the reservoir 17 and the cylinder chamber b under the control of a valve 65 in the form of a ring which seats against the top of the portion 60 of the valve body and normally is urged to its seat covering and closing the openings 64 by a coil spring 66 suitably anchored at its top to the intermediate portion 62 of said valve body.

The lower and intermediate portions of the valve body 61 are chambered as indicated at 67 and the top portion 63 of said body is bored as indicated at 68. The wall defining the chamber 67 is interiorly screw-threaded at its bottom and has threadedly engaged therewith a plug 69 through which extend openings 70 affording constant communication between the chamber 67 and the ducts 57. In said plug 69 is a central bore 71 which is closed at its bottom and opens through the top of said plug.

Slidably engaged at its lower end in the bore 71 and extending upwardly through the chamber 67 into the bore 68 is a valve 72 the upper portion of which neatly fits said bore 68 and the lower portion of which is of slightly greater diameter than said upper portion to provide a shoulder for engagement with the wall defining the top of the chamber 67 to limit upward movement of the valve.

The valve 72 is of closed top, open bottom, hollow construction and normally is urged to its uppermost limit of movement by a coil spring 73 interposed between the same and the plug 69. Also interposed between said valve 72 and the plug 69 is a second coil spring 74 which normally is inactive, but which becomes active to resist downward movement of said valve following a predetermined amount of downward movement thereof.

In the top portion 63 of the valve body 61 are transverse openings 75 affording communication between the cylinder chamber b and the bore 68, and in the valve 72 are two exterior annular grooves 76 and 77 spaced one above the other and disposed above the openings 75 when the valve is in its normal uppermost position. Formed through the valve and providing communication between the interior thereof and the grooves 76 and 77 are openings 78. Also formed through the valve and providing communication between its interior and its exterior are openings 79 which, in the normal uppermost position of the valve, are disposed within and directly adjacent to the lower end portion of the base 68. In addition, other openings 80 are formed through the lower end portion of the valve 72 at points such that they are disposed directly above the top of the plug 69 when the valve is in its normal, uppermost position.

Exteriorly, the top portion 63 of the valve body 61 is suitably formed to be engaged by a wrench which may be inserted through the cylinder 10 when the head 14, the removable cylinder head 26 and the piston 11 are removed. Thus, said valve body 61 may readily be unscrewed and removed from the head 15 and when removed, access may readily be had to the valve parts simply by unscrewing the plug 69.

In the upper portion of the cylinder 10 at spaced points therealong is a series of small openings 81 affording restricted communication between said cylinder and the passageway 16, while in the extreme top portion of said cylinder 10 are openings 82 affording free communication between said cylinder and said passageway.

Assuming that the lugs 19 and 20 are connected to the chassis and the axle, respectively, of a motor vehicle; that the leaf springs of the vehicle are under normal load; that the piston 11 is in its normal position approximately midway between the ends of the cylinder 10; that the valves are in their aforementioned normal positions, and that the shock absorber is charged with oil or other suitable liquid, the same has four distinct phases of operation; viz. (1) compression above normal, as when an obstruction in a roadway is encountered and the vehicle springs are compressed and the cylinder 10 is moved upwardly relative to the piston 11; (2) rebound above normal, or downward movement of the cylinder 10 relative to the piston 11 following "compression above normal"; (3) rebound below normal, as when a depression in a roadway is encountered and the vehicle springs are deflected and the cylinder 10 moves downwardly relative to the piston 11; and (4) compression below normal, or upward movement of the cylinder relative to the piston following "rebound below normal."

As "compression above normal" occurs, the piston 11 and the head 15 move toward each other and the liquid in the chamber b is subjected to pressure. The check valve 65 being closed, flow of liquid from the chamber b through the openings 64 is prevented. Moreover, although the pressure of the liquid on top of the valve 72, which valve is exposed at its top to the pressure of the liquid in the chamber b, results in downward movement and consequent opening of this valve, not sufficient liquid may escape through this valve, nor through the openings 48 and 47 around the metering pin 51, to permit the piston 11 and the head 15 to move toward each other at a required initial rapid rate. Therefore, the valve 44 opens and liquid flows from the chamber b through the openings 43, the chamber 41 and the openings 42 into the chamber a, at a rate determined by the strength of the spring 46, the areas of the openings 43 and 42 and the resistance to upward movement of the valve 44 by the metering pin body 50 to permit the piston 11 and the head 15 to move toward each other at a desired rate.

Due to the presence of the piston rod 18 in the chamber a, this chamber cannot accommodate all of the liquid that is forced from the chamber b. The excess liquid therefore is forced through the valve at the bottom of the shock absorber into the reservoir 17. In this connection, the rate of flow of the liquid through the latter valve is dependent, of course, upon the suddenness of the movement of the piston 11 and the head 15 toward each other and the pressure generated in the chamber b. If the movement and the pressure generated are normal, the valve 72 is forced downwardly until the groove 76 aligns with the openings 75, at which point the spring 74 becomes effective to resist further downward movement of said valve 72. Thereupon, liquid flows through said openings 75 into the groove 76, through the openings 78 into the interior of the valve 72, from said valve through the openings 79 into the chamber 67, and from said chamber through the openings 70 and the ducts 57 and 58 into the liquid reservoir 17 at a rate determined by the areas of the openings 78. If, on the other hand, the movement is sudden and the pressure is high, the valve 72 is moved farther downwardly, against the resistance of both springs 73 and 74, until the groove 77 becomes aligned with the openings 75. The flow of liquid then is the same as just set forth, except that it is more rapid due to the fact that the groove 77 and the related openings 78 are wider and of greater area, respectively, than the groove 76 and its related openings 78. During initial downward movement of the valve 72, liquid within said valve and the chamber 71 escapes through the openings 80.

Regarding both normal and exceptionally sudden movements of the piston 11 and the head 15 toward each other, it will be noted that the upwardly increasing sectional area of the bottom portion of the chamber 41 provides for an increasing rate of flow of liquid through the piston 11 as the amount of opening movement of the valve 46 is increased, which in conjunction with the valve 72, obviously provides for smoothness in checking shocks which produce the "compression above normal" phase of operation of the shock absorber.

As the "rebound above normal" phase of operation of the shock absorber occurs following the "compression above normal" phase of operation thereof, the piston 11, in its return to its normal position, moves toward the head 14, thereby subjecting the liquid in the chamber a to pressure. The liquid obviously cannot flow from the chamber a to the chamber b except through the piston 11, and it cannot flow through the openings 42, 43 of said piston because of the immediate closing of the openings 43 by the valve disk 44. Therefore, the liquid is required to flow through the openings 54 in the flange 45 of the valve disk 44 and around the metering pin 51 through the openings 47 and 48 into the chamber b. Since, however, not enough liquid is contained in the chamber a to fill the chamber b, the valve 65 opens and a sufficient quantity of liquid is drawn from the reservoir 17 into the chamber b to maintain the same filled.

Although the valve disk 44 closes immediately upon reversal of the shock absorber from its "compression above normal" phase of operation to its "rebound above normal" phase of operation, the metering pin body 50 and the metering pin can return to their normal positions, even though urged by the spring 52, only as fast as liquid can enter the bore or dash-pot chamber 49. Therefore, the return of the metering pin to its normal position is gradual and at a rate determined by the strength of the spring 52, the provision for flow of liquid to and from the bore or chamber 49, and the difference in the end areas of the metering pin body which are subjected to liquid pressure above the disk valve 44. Thus, as the piston 11 moves upwardly, the effective area of the opening 47 initially is restricted, but increases with upward movement of the piston. In the case of application of the shock absorber to a motor vehicle, this means, of course, that upon rebound of the vehicle springs following compression thereof, the flow of liquid from the chamber a to the chamber b is at an increasing rate so as to effectively resist rapid expansion of the vehicle springs when they are most highly energized and to permit their more rapid expansion as their energy decreases. The vehicle body thus is relieved of shock due to rebound of the vehicle springs.

The "rebound below normal" phase of operation of the shock absorber occurs whenever for any reason the piston 11 is moved from its normal position, or approximately its normal position, toward the head 14. Upon initiation of such movement of the piston, liquid flows only through the metering pin controlled opening 47 and liquid to maintain the chamber $b$ filled is drawn from the reservoir through the openings 64. Therefore, initial movement of the piston 11 from its normal position toward the head 14 is effectively checked. However, as the piston moves toward the head 14, it moves above one or more of the openings 81, and thereby establishes direct communication between the passageway 16 and from said passageway into the chamber $b$ through the opening, or openings 81 below the piston. In this connection, since the resistance to flow of the liquid from the chamber $a$ to the chamber $b$ obviously decreases as the piston moves toward the head 14, the resistance to movement of the piston toward said head decreases as it moves toward said head. Consequently, the piston 11 is eased toward the head 14 first gradually and then at an accelerated rate in a desired manner to obtain smooth checking or absorption of shocks which produce the "rebound below normal" phase of operation of the shock absorber. In the case of application of the shock absorber to a motor vehicle, this means, of course, that upon passage of the vehicle over a depression in the road surface, the wheels are not permitted to drop suddenly into the depression, but are gradually eased downwardly initially and only are permitted to move more rapidly downward as the energy of the vehicle springs is expended. Thus, "pull down" of the vehicle chassis and body is avoided and again the latter are relieved of any shock.

Following the "rebound below normal" phase of operation there occurs the "compression below normal" phase of operation characterized by return movement of the piston 11 to its normal position. As the piston 11 moves from a position above its normal position toward the head 15, liquid flows from the chamber $b$ through the openings 81 below the piston into the passageway 16 and through said passageway and the openings 82 and also the openings 81 above the piston, into the chamber $a$. Obviously, the freedom of such flow progressively decreases due to the progressive covering by the piston of the openings 81 therebelow. At the same time, the valve disk 44 rises and some of the liquid flows from the chamber $b$ through the piston openings 43 and 42 to the chamber $a$. Moreover, an additional amount of liquid flows from the chamber $b$ to the chamber $a$ through the openings 48 and 47 around the metering pin 51, and since the chamber $a$ cannot accommodate all of the liquid that is forced from the chamber $b$, the excess liquid is forced through the valve 72 to the reservoir 17, all as heretofore set forth in connection with the "compression above normal" phase of operation of the shock absorber. Accordingly, the "compression below normal" phase of operation of the shock absorber is characterized by relatively rapid initial movement and subsequent progressively retarded movement of the piston 11 to its normal position. In the case of application of the shock absorber to a motor vehicle, this means, of course, that as the distended vehicle springs return to their normal positions, they are permitted to do so rapidly initially and then are smoothly checked.

Figure 4:
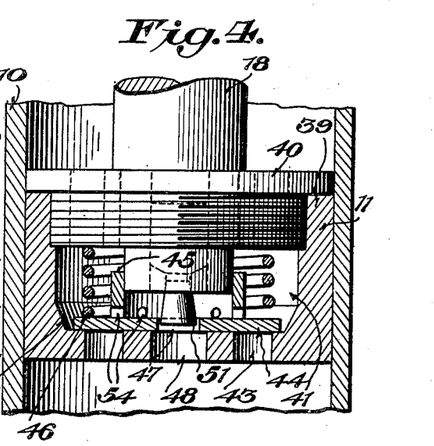
Figure 4 is a view similar to Figure 2 illustrating another position of the liquid metering pin of the rebound control valve.

It will be understood that the size of the opening 47, the design of the metering pin 51, the provision for return movement of said pin to its normal position following a raising thereof by the valve disk 44 and subsequent seating of said disk as well as the design of the various other parts of the present shock absorber may be varied within a considerable range to obtain desired operation under particular conditions of installation. In this connection, the shock absorber illustrated is of a design for use on an average motor vehicle to obtain best riding qualities thereof assuming its normal speed to be in the neighborhood of thirty miles per hour and its high speed to be in the neighborhood of sixty miles per hour. By experiment it has been found that the size of the opening 47 and that the length, taper and amplitude of movement of the metering pin 51 have definite values to obtain best riding qualities of the vehicle within the approximate speed range stated. In other words, for maximum vehicle spring compression at a vehicle speed of approximately thirty miles per hour, the metering pin 51, at the moment of fluid reversal or the beginning of the "rebound above normal" phase of operation, will be at a point approximately as illustrated in Figure 4 of the drawings; that is, its lower end portion of greatest diameter will be disposed within the opening 47 reducing the flow of liquid through said opening to a minimum and causing the shock absorber to hold chassis reactions from spring rebound down to about eight oscillations per minute.

Figure 3:
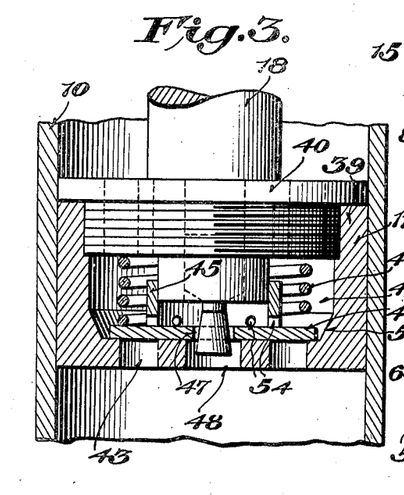
Figure 3 is a view similar to Figure 2 illustrating an intermediate position of the liquid metering pin of the rebound control valve.

As the speed of the vehicle is increased to, say sixty miles per hour, its spring reactions naturally will double. Hence, rebound pressure will rise in the shock absorber with corresponding increase in the velocity of the liquid. The metering pin 51 therefore will return toward its normal position at increased speed due to the liquid entering the base or chamber 49, twice as fast as it did at the thirty miles per hour speed of the vehicle. Hence, for maximum vehicle spring compression at a vehicle speed of about sixty miles per hour, the metering pin, at the moment of fluid reversal, will be approximately at the point illustrated in Figure 3. The effective area of the opening 47 then will be approximately twice as great as it was at a thirty mile per hour speed of the vehicle, and the same holds true proportionally for all intermediate and higher and lower speeds. In other words, the present shock absorber affords approximately the same degree of proportional control for substantially all speeds of the vehicle.

As will be understood, the valve 72 is a multi-stage offering either a smaller or larger orifice for liquid escape from the chamber $a$ to govern the pressure of the liquid within said chamber according to the sudden movement of the piston 11 toward the head 15.

As heretofore stated, the present shock absorber may be mounted either vertically, horizontally, or at an inclination to the vertical. In the case of application of the shock absorber to automobiles, it usually is mounted at an inclination to the vertical. Depending upon the inclination of the shock absorber and the amount of movement of the vehicle body toward and from the vehicle axle, there will be produced more or less rotation of the shock absorber about the axes of its mounting pins in a vertical plane extending longitudinally of the vehicle. Also, due to side sway of the vehicle body, as when the vehicle is travelling around a curve, or when a wheel at one side of the vehicle encounters an obstruction or a depression not encountered by the opposite wheel, there will be produced more or less rotation of the shock absorber relative to its mounting pins in a plane at right angles to said first mentioned plane. In this connection, Figure 9 of the drawings illustrates an improved universal joint mounting means for the ends of the shock absorber permitting the latter to partake of said rotary movements separately and simultaneously.

Figure 9:
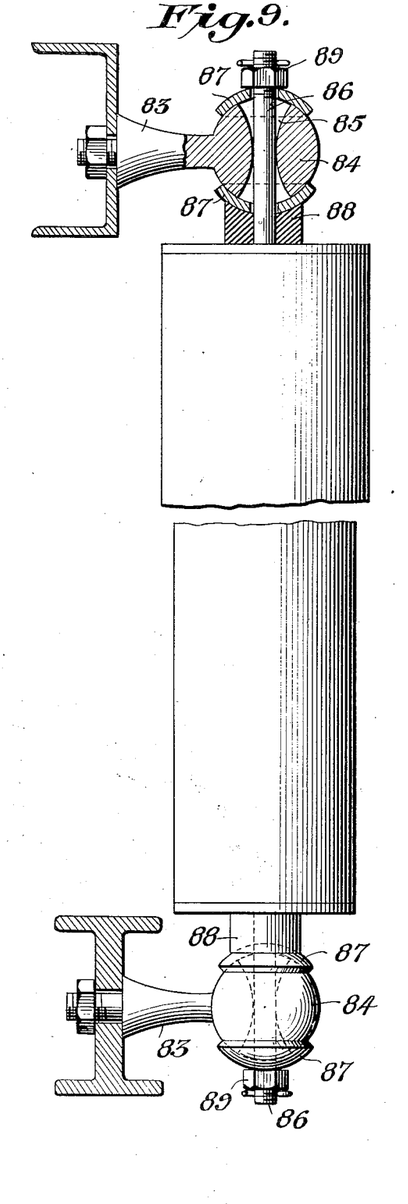
Figure 9 is a sectional view illustrating an improved universal joint mounting means for the ends of the shock absorber.

The mounting pins, designated as 83, 83 are of any suitable design to be secured in any suitable manner to the vehicle chassis and the vehicle axle, respectively, and each terminates in a spherical head 84 having extending therethrough an opening 85 which flares outwardly from its middle where it is of a diameter corresponding to a related connecting stud 86, one extending axially from the head 14 and the other from the lug 19 or the piston rod 18 through the said opening 85 in the head of the related pin 83.

On each stud 86, at opposite sides of the related head 84, respectively, is a pair of dished washers 87 which conform in contour to the head 84 and closely engage same, thereby enclosing the flared ends of the opening 85 which contains a suitable lubricant such as graphite. Engaged on each stud 86, between the shock absorber part carrying said stud and the adjacent washer 87, is a rubber washer 88, while on the outer end of each stud 86 is engaged a nut 89 serving to maintain a connected and assembled relationship between the parts of each of the joints.

As is apparent, the joints described not only permit free universal pivotal movements of the shock absorber relative to the vehicle chassis and the vehicle axle, but are of simple construction and capable of economical manufacture; possess long life especially because of the rubber washers 88 not being subjected to wiping abrasive action; permit the use of rubber washers of any desired inherent resilience, and, whenever the necessity arises, may readily be disassembled and equally as readily reassembled.

Figure 10:
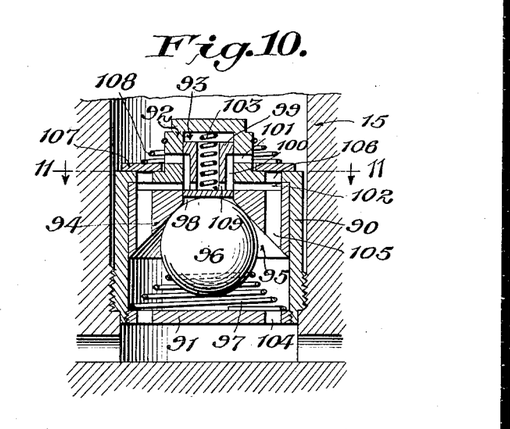
Figure 10 is a detail sectional view illustrating an alternative form of valve for use in the present shock absorber.

In Figure 10 of the drawings is illustrated a novel inertia weight operable valve which may be used in lieu of the valve illustrated in detail in Figure 5 of the drawings. This valve comprises a hollow body 90 which is exteriorly threaded at its bottom to be screwed into the head 15 in the same manner as the valve body 61, and which is of closed top, open bottom construction closed at its bottom by a plug 91 and having extending centrally upward from its top wall an extension 92 having a bore 93 which is closed at its top and open at its bottom into said body 90.

Disposed within the body 90 and constituting to all intentions and purposes a part thereof is a block 94 the bottom of which is formed with a recess 95 which flares downwardly and outwardly in all directions or, in other words, is of conical shape, and which accomodates an inertia weight 96 in the form of a comparatively heavy metal ball which is constantly urged upwardly into said recess 95 by a spring 97 seated at its top against said ball and at its bottom against the plug 91.

In the top portion of the block 94, centrally thereof, is a bore 98 which is of the same diameter as, and aligned with, the bore 93 and into which normally extends the top portion of the ball 96.

Figures 11, 12:
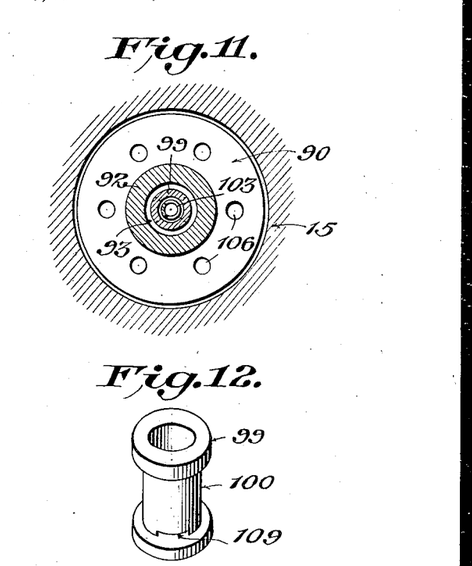
Figure 11 is a cross section on the line 11—11 of Figure 10.
Figure 12 is a perspective view of the liquid metering valve shown in Figure 10.

Within the bores 93, 98 is slidably mounted a liquid metering element 99 in the form of a spool having an annular exterior recess 100 between its ends and of such length as to afford open communication between parts 101 extending through the extension 92 and a top recess 102 in the block 94, when the spool, which rests at its bottom on the top of the ball 96, is held in its normal uppermost position by said ball.

The spool 99 is of hollow, closed bottom, open top form and contains a coil spring 103 which is seated at its top against the top wall of the extension 92 and tends constantly to urge the spool downwardly, being prevented from doing so normally, however, because it is weaker than the spring 97.

Formed through the plug 91, the block 94 and the top wall of the body 90 are openings 104, 105 and 106, respectively, for flow of liquid from the reservoir 17 under the control of a check valve 107 arranged to seat downwardly upon the top wall of the body 90 and normally urged to its seat by a spring 108. The openings 105 open into the recess 102 in the top of the block 94 and, therefore, also provide for flow of liquid from said recess to and through the openings 104 to the reservoir 17.

Assuming that the parts of the valve are in their normal positions illustrated in Figure 10, it is apparent that any sudden compression disturbance to which the shock absorber may be subjected with resultant sudden upward movement of the shock absorber, will result, due to the inertia or tendency of the ball 96 to remain stationary, in upward movement of the body 90 and the block 94 relative to said ball. Therefore, the spring 103 will act to move the spool 99 downwardly and to cause the upper portion thereof to more or less cut off flow of liquid from the chamber $b$ through the openings 101, thereby checking the disturbance. Similarly, if the speed of the vehicle is suddenly decreased, or is suddenly accelerated, the inertia of the ball 96 combined with the decreased or increased lateral speed, as the case may be, of the body 90 and the block 94, will result in relative lateral movement between the ball and the block with the result that the ball will be caused to move downwardly along the conical under surface of the block with the same result as first mentioned; viz., to permit the spring 103 to move the spool 99 downwardly to more or less cut off flow of liquid through the openings 101, depending upon the suddenness of the deceleration or acceleration as the case may be. Similarly, any sudden sidewise movement of the vehicle, as when rounding a curve, obviously will produce the same result. In other words, the valve illustrated in Figure 10 operates independently of pressure generated in the chamber $b$ and independently of the volume of liquid forced from said chamber, as it controls the flow of liquid from said chamber solely in response to movement of the ball 96 relative to the block 94 or the body 90 due to inertia and, of course, according to the amplitude of the compression shock to which the shock absorber is subjected. Thus, "nosing down" and sidesway, so prevalent with soft front end suspensions of present day automobiles, is greatly minimized. At the same time, all ordinary compression shocks are effectively controlled and absorbed, for as fast as compression and rebound oscillations occur, the inertia weight 96 moves up and down and the effective area of the openings 101 is correspondingly varied. In this connection it will be understood, of course, that the strength of the spring 97 determines the severity of shocks necessary to effect more or less closing and opening of the openings 101. Therefore, by varying the strength of the spring 97, the shock absorber may be caused to function to absorb compression shock either quickly, slowly or at any desired rate.

In order to avoid formation within the bore 93 of a vacuum or a liquid abutment which would affect freedom of movement of the spool 99 within said bore, the said spool is provided with openings 109 affording communication between its exterior and its interior. Consequently the pressure inside of said bore and spool is the same as the pressure exteriorly of said spool.

As will be understood, the block 94 is formed separately from the valve body 90 and is press fitted or otherwise suitably secured within said body solely for the sake of economy and convenience in manufacture. Were it practical to form the block 94 as an integral part of the body 90, this is entirely within the purview of the invention.

Without further description it is thought that the features and advantages of the invention will be readily apparent to those skilled in the art, and it will of course be understood, that changes in the form, proportion and minor details of construction may be resorted to, without departing from the spirit of the invention and scope of the appended claims.

I claim:—

1. A hydraulic shock absorber comprising a cylinder, a piston reciprocable within said cylinder and having a normal position between the ends thereof dividing the cylinder into separate pressure chambers, a tube surrounding the cylinder in spaced relationship thereto to provide a liquid passageway, a casing surrounding said tube in spaced relationship thereto to provide a liquid reservoir, heads closing the ends of said cylinder, tube and casing, a piston rod extending from the piston through one of said heads, the portion of the cylinder between the piston when the latter is in its normal position and the head through which the piston rod extends having a longitudinally extending series of openings to be successively passed by the piston when the latter is moved toward said last mentioned head to afford communication between the pressure chambers, a liquid pressure control valve mounted in the other head and controlling flow of liquid between the adjacent pressure chamber and the reservoir, and a valve carried by the piston and operable to control flow of liquid through the piston between the pressure chambers at variable rates dependent upon the pressure of the liquid.

2. A hydraulic shock absorber comprising a cylinder, a piston reciprocable within said cylinder and having a normal position between the ends thereof dividing the cylinder into separate pressure chambers, heads closing the ends of said cylinder, a piston rod extending from the piston through one of said heads, means providing progressively increasing areas of communication through the cylinder wall between the pressure chambers when the piston is moved from its normal position toward the head through which the piston rod extends, a liquid reservoir, a valve mounted in the other head operable to regulate the liquid pressure in the adjacent pressure chamber and to control flow of liquid between said chamber and the liquid reservoir, and a piston carried valve operable to control flow of liquid through the piston between the pressure chambers at variable rates dependent upon the pressure of the liquid.

3. In a hydraulic shock absorber, a cylinder, heads closing the ends thereof, a piston reciprocable within said cylinder and having openings for flow of liquid therethrough, a disk check valve controlling said openings, said disk check valve having an opening, and a metering pin cooperating with the opening in said disk check valve to regulate flow of liquid through the piston when the disk check valve is closed, said metering pin being mounted to move with the disk check valve when the latter is opened and upon closing of the disk check valve to be returned to a predetermined position relative thereto at a rate determined by the pressure of the liquid, said metering pin being shaped to vary the effective area of the opening in said disk check valve according to the position of said pin relative to the disk check valve.

4. In a hydraulic shock absorber, a cylinder, heads closing the ends thereof, a piston reciprocable within said cylinder and having openings for flow of liquid therethrough, a disk check valve controlling said openings, said disk check valve having an opening, and a metering pin cooperating with the opening in said disk check valve to regulate flow of liquid through the piston when the disk check valve is closed, said metering pin being mounted to remain substantially in the position to which it is moved by the disk check valve when the latter closes and to return to its original position relative to said disk check valve at a rate determined by the pressure of the liquid and during its return to permit a progressively higher rate of flow of liquid through the opening in the disk check valve.

5. In a hydraulic shock absorber, a cylinder, heads closing the ends thereof, a piston reciprocable within said cylinder and having openings for flow of liquid therethrough, a disk check valve controlling said openings, said disk check valve having an opening, and a metering pin cooperating with the opening in said disk check valve to regulate flow of liquid through the piston when the disk check valve is closed, a dash pot fixed with respect to said piston, said metering pin having a body slidably mounted in said dash pot, said dash pot and metering pin body being disposed so that the metering pin body is moved into said dash pot by the disk valve when the latter is opened, and means providing for restricted flow of liquid into said dash pot whereby movement of the metering pin to its original position relative to the disk valve following closing of the disk valve is at a rate dependent upon the pressure of the liquid, said metering pin being shaped to permit progressive increase of the effective area of the opening in said disk valve as said pin moves toward its original position relative to said disk valve.

6. In a hydraulic shock absorber as set forth in claim 3, the piston having a chamber in which the disk valve is disposed, and said chamber having side walls surrounding said disk valve and flaring in the direction of opening movement of said valve.

7. In a hydraulic shock absorber, a cylinder, heads closing the ends of said cylinder, a piston reciprocable within said cylinder, means controlling flow of liquid between the cylinder chambers at opposite sides of said piston, a liquid reservoir, and valve means at one end of said cylinder to control the pressure of the liquid in said cylinder and flow of liquid between said cylinder and said reservoir, said valve means including a check valve element to control flow of liquid from the reservoir to the cylinder, and a piston valve element to control flow of liquid from the cylinder to the reservoir, said piston valve element being mounted to be moved by the liquid in the cylinder an amount dependent upon the pressure of the liquid and having different sets of openings of different sizes rendered effective to permit escape of different amounts of liquid from the cylinder to the reservoir dependent upon the amount of movement imparted to said piston valve by the liquid in the cylinder.

8. A hydraulic shock absorber comprising a cylinder, heads closing the ends of said cylinder, a piston reciprocable within said cylinder, a piston carried valve operable by variations in pressure of the liquid in the cylinder to vary the rate of flow of liquid through the piston from one side to the other side thereof, a liquid reservoir, a check valve controlling flow of liquid from said reservoir to said cylinder, and a pressure relief valve controlling flow of liquid from said cylinder to said reservoir and operable by changes in the pressure of the liquid in the cylinder to vary the rate of flow of the liquid to the reservoir, said pressure relief valve comprising a hollow casing in one end of the cylinder separating the latter from the reservoir and having its interior in communication with the reservoir, said casing having a port affording communication between its interior and the cylinder, a piston slidable in said casing and exposed at its inner end to be subjected to pressure created in the cylinder so as to be moved outwardly by such pressure, and spring means urging said pressure relief valve piston constantly inward, said piston having a series of ports of different sectional areas to successively aline with said casing part for flow of liquid from the cylinder to the reservoir when said piston is moved outwardly.

9. The combination as set forth in claim 8 in which the check valve and the pressure relief valve are combined in a unitary structure mounted in one of the cylinder heads and removable as a unit through the cylinder when the other end of the cylinder is opened.

10. The combination as set forth in claim 8 in which one of the heads has a removable cylinder head to permit removal of the piston, the check valve and the pressure relief valve, and in which the pressure relief valve and the check valve are combined in a unitary structure removably mounted in the other head in alignment with the cylinder for removal therethrough.

11. In a hydraulic shock absorber, a cylinder, a piston reciprocable therein, an inertia weight mounted for vertical movement and for lateral movement in all directions relative to said cylinder, and a valve controlled by vertical and lateral relative movements between said cylinder and weight for regulating flow of liquid from the space between the piston and one end of the cylinder proportionately to the amplitude of the relative movement between the cylinder and the inertia weight.

12. In a hydraulic shock absorber, a cylinder, a piston reciprocable therein, a hollow valve body carried by said cylinder, a spherical inertia weight within said body, a conical surface within said body, a spring urging said inertia weight against said surface, a valve, and a spring urging said valve against said inertia weight in a direction opposite to the direction in which the inerta weight is urged by its spring, said valve controlling an opening through which liquid may flow from the space between the piston and one end of said cylinder.

13. In a hydraulic shock absorber, a cylinder, a piston reciprocable therein, a spherical inertia weight carried by said cylinder for vertical movement and for lateral movement in all directions relative thereto, a member carried by said cylinder and having a conical surface, a spring urging said inertia weight against said surface, a valve, and a spring urging said valve against said inertia weight in a direction opposite to the direction in which said inertia weight is urged by its spring, said valve controlling an opening through which liquid may flow from the space between the piston and one end of said cylinder.

14. In a hydraulic shock absorber, a cylinder, heads closing the ends thereof, a piston reciprocable within said cylinder and having openings for flow of liquid therethrough, a check valve controlling said openings, said check valve having an opening, and a metering pin cooperating with the opening in said check valve to regulate flow of liquid through the piston when the check valve is closed, said metering pin being mounted to move with the check valve when the latter is opened and upon closing of the check valve to be returned to a predetermined position relative thereto at a rate determined by the pressure of the liquid, said metering pin being shaped to vary the effective area of the opening in said check valve according to the position of said pin relative to the check valve.

15. In a hydraulic shock absorber, a cylinder, heads closing the ends thereof, a piston reciprocable within said cylinder and having openings for flow of liquid therethrough, a check valve controlling said openings, said check valve having an opening, and a metering pin cooperating with the opening in said check valve to regulate flow of liquid through the piston when the check valve is closed, said metering pin having a normal position relative to said check valve when the latter is closed and being mounted to be moved by and with said check valve when the latter is opened and, when the check valve subsequently closes, to return to its normal position relative to said check valve at a rate determined by the pressure of the liquid, said metering pin being formed so that during its return to its normal position it permits a progressively higher rate of flow of liquid through the opening in the check valve.

16. The combination as set forth in claim 15 comprising dash pot means controlling movement of the metering pin with and relative to the check valve.

17. In a hydraulic shock absorber, a cylinder, a piston reciprocable therein, a hollow valve body carried by said cylinder, a conical surface within said body, an inertia weight having a spherical surface cooperating with said conical surface, a spring urging said inertia weight against said conical surface, and means controlled by movement of said inertia weight relative to said conical surface to control flow of liquid from the space between the piston and one end of the cylinder.

NEVIN S. FOCHT.